United States Patent
Bartlett et al.

[15] 3,651,477
[45] Mar. 21, 1972

[54] PROCESS CONTROL SYSTEM

[72] Inventors: Peter G. Bartlett; Donald E. Henry, both of Davenport, Iowa

[73] Assignee: Struthers-Dunn, Inc., Pitman, N.J.

[22] Filed: June 18, 1970

[21] Appl. No.: 47,328

[52] U.S. Cl. ................340/172.5, 235/151.1, 307/252 UA
[51] Int. Cl. ................................G06f 1/04, G06f 15/46
[58] Field of Search............................340/172.5; 235/151.1; 307/252 UA; 328/73

[56] References Cited

UNITED STATES PATENTS 3,434,115  3/1969  Chomicki .........................340/172.5
3,445,639  5/1969  Martens.............................235/151.1

*Primary Examiner*—Raulfe B. Zache
*Attorney*—William D. Hall, Elliott I. Pollock, Fred C. Philpitt, George Vande Sande, Charles F. Steininger and Robert R. Priddy

[57] ABSTRACT

The present invention provides a process control system which minimizes the effect of noise on the system and also minimizes the amount of noise produced by the system. This is accomplished by properly timing all operations, both sensing and control, so as to both minimize the possibility of a spurious signal caused by noise and also minimize the amount of noise produced by the system in its operation. The sensing function is timed to occur when the power source voltage is at a maximum. When the power source voltage goes through zero the control operations, i.e., switching or relays, etc., is effected. After completion of the sensing function, but prior to the control operations, the indications previously sensed are stored in a high-speed memory and the process control decision making apparatus is enabled.

10 Claims, 4 Drawing Figures

INVENTORS
Peter G. Bartlett
Donald E. Henry

BY Hall, Pollock + Vande Sande
ATTORNEY 3,651,477

PROCESS CONTROL SYSTEM

BACKGROUND OF THE INVENTION

Process control systems and their advantages are by now well known to the art. Such systems are useful in manufacturing processes, chemical and mechanical, to reduce the necessity of human intervention in the process. Extensive use of process control systems has led to the realization of the completely automatic manufacturing facility. In this type of facility, raw materials are fed in at one end and finished goods are delivered from the other end without human intervention of any kind. The realization of facilities of the foregoing type is due in large part to the process control system which performs functions that would otherwise require the services of a human operator.

The obvious advantages of process control systems include the ability to operate a facility 24 hours a day, the elimination of operator error, the elimination of scheduling difficulties caused by operator illness or absence, and the ability to operate the facility only at such times as demand exists for its finished product. Process control systems represent a combination of manufacturing techniques with electronic data processing and electrical control systems to perform the required functions.

For discussion purposes, the various functions performed by a process control system can be broken down into three different and exclusive groups. The first group of functions to be performed is the function of sensing, that is the sensing of process control parameters to determine whether the process being performed conforms to the plan set up by the system designers. Sensing includes such specific functions as determining when additional raw materials are required, determining when partly finished goods are in operative position to be worked on, etc.

Next, the information gathered by the control system during the sensing operation is then applied to perform the second overall type of function which is that of revising the various process control commands which control events which are to take place in the manufacturing operation. The information gathered by the sensing means is ordinarily converted for use in a high-speed electronic portion of the process control system. It is then operated on in accordance with instructions previously stored in the electronic control system so as to generate the revised process control commands which are to be executed for proper operation of the system.

Finally, the revised commands are used in performance of the third general function of process control systems, namely that of executing the revised process control commands. Specific functions in this group include operations such as energizing a conveyor to transport additional raw materials to a processing point, energizing a processing operator such as a drill press or an automatic screw machine to perform its intended operation on a work piece which a sensing means has sensed is now properly positioned, deenergizing a conveyor when a partially completed work piece is in proper position for additional working, etc.

One problem which is present and must be taken into account whenever electrical equipment is used is the problem of noise. Noise may be defined as any unwanted electrical signal. Noise elimination or reduction is desirable for noise can cause the electrical system to generate spurious or erroneous signals. Noise is generated by a number of sources which can be thought of as external to the electrical system or it can be generated internally. Although electrical and electronic systems utilized in process control systems are designed with noise considerations in mind, the process control environment inherently adds to the noise problem. The electronic subsystems which make up the process control system are similar in many respects to the electronic subsystems utilized in computers. However, most computers are designed to operate, and do operate, in well-shielded areas with low electrical noise. By contrast, the typical industrial control systems share an environment with large motors, high-voltage switches, hydraulic solenoids, and arc welders. Obviously, in this type of environment noise immunity is far more critical than operation in the environment which computer systems generally enjoy.

It is generally conceded in the process control industry, and even in the broader industry of electrical and electronic controls that noise is such a complex problem that it cannot be analyzed mathematically. Therefore, selecting and providing noise prevention techniques and features is more an art than a science. A variety of noise immunity techniques are well known such as special printed card spacing, routing of leads and buses, bypassing power supplies, etc. Due to the complexity of the noise problem as a whole and the inability to analyze it mathematically, many noise immunity techniques evolve on a cut-and-try method. Indeed, the amount of additional components and equipment necessary to protect the control system from electrical noise can increase the cost to a point where it is economically desirable to seek other methods of operating to obtain the desired results.

SUMMARY OF THE INVENTION

It is therefore one object of the present invention to provide a process control system which minimizes the effect that noise can have on the system. It is another object of the present invention to provide a process control system which minimizes the amount of noise which is generated internally in the system.

It is another object of the present invention to provide a process control system which is designed to provide the maximum protection against generating spurious signals due to noise.

Other and further objects of the present invention will become apparent as the description proceeds.

The present invention achieves the above objects by segregating the functions performed by the various subsystems of the process control system into the three overall functional categories of sensing, revising process control commands, and execution of process control commands. Each of the various functions occurs at a predetermined period of time which is designed to minimize the effect on that function of noise present in the system and is also designed so that the operation of that function itself produces a minimum amount of noise. The process control system may operate from a low-frequency sine wave power source such as the commercial 60-cycle power system. All of the above functions are timed in accordance with the cyclical variations of the power source.

The first function, that is the sensing function, is timed to occur when the power source voltage is at a maximum. The sensing signals are derived from the power source and therefore, at this time, each of the sensing signals will be at a maximum amplitude. Because each of the sensing functions operates only at a time when each of the sensing signals is at a maximum amplitude condition, each of the sensing circuits can have its threshold level at a relatively high value. This will reduce the number of spurious signals generated in the sensing circuits by noise inasmuch as only relatively large noise signals will generate a spurious sensing signal. Furthermore, and conversely the noise signal required to negate an otherwise required sensing signal will be relatively large and therefore relatively infrequent due to the large amplitude of the sensing signal itself. An additional factor which minimizes the effect of noise is that since the sensing function is operative only during a predetermined portion of the power source cycle, noise signals generated in the sensing circuits at other times are ineffective, regardless of their amplitude.

The second general type function, namely that of revising the process control commands, takes place at a time subsequent to the sensing function but prior to the time that the power source voltage goes through zero amplitude. Thus, a sufficient time elapses so that the signals in the sensing circuits will have been established and are stable. At this time, the signals from the sensing circuits are transformed by an interface to be useable in the high-speed electronic portion of the control system which revises and updates the process control commands. The transformed sensing signal is operated on in accordance with other sensing signals and with predetermined stored information to generate revised process control command signals. The timing of this phase of the operation is designed so that it occurs just subsequent to the introduction of new sensing data so that the revised process control commands generated take into account all the recent variations in the changing conditions in the process being controlled. The timing of this function is also important in that it is delayed until the sensing circuit conditions are stabilized and accurately reflect the process conditions as sensed by the various parameter sensors.

The third and last general function is timed to take place when the power source voltage passes through its zero amplitude position. This function is that of executing the now updated process control commands. Specific functions that will be performed in this time period include energization or deenergization of motors, solenoids, welders, and the like. Changing the condition of the load circuit of these devices at the time the power source voltage is passing through zero is designed to minimize the noise generated by this operation. It is well known that the switching of reactive loads such as motors, solenoids, and the like is generally accompanied by the generation of noise signals. Effecting these switching functions when the voltage which will energize these loads passes through zero minimizes the amplitude of the noise generated. Of course, minimizing the amplitude of the noise signals generated will minimize the possibility that such noise signals will cause spurious signals in other portions of the system.

It is important to note that although a large number of functions appear to take place in the second period discussed above, namely that of acting on the new sensing information and revising the process control commands, this large number of functions can readily be fit into the available time. The first and third functions occur in the time frame of the power source voltage variations while the second function occurs in high-speed electronic circuitry which occurs at a much faster rate than the other functions. The first and third functions are concerned with sensing and operating switches and the like whose high inertia causes such operations to consume time which is measured in the millisecond range. In contrast, the functions of storing and acting on the data sensed occurs in the high-speed electronic portions of the system which functions are performed in time measured in microseconds. For example, if in one power source cycle of 16 milliseconds, two cycles of process control functions are to be performed, each cycle, from the time of sensing at the maximum amplitude, to execution at zero amplitude, occupies 4 milliseconds in time. We can readily allow 1 millisecond at the point of maximum amplitude for the sensing function and an additional millisecond prior to the zero amplitude point in the power source wave for execution. This leaves 2 milliseconds for functions that are required for updating process control commands. In the context of a megacycle circuit, well within the present technological level, the 2-millisecond period available is quite sufficient to perform the required functions. In addition, the execution phase of one process control cycle and the next sensing function are separated by 4 milliseconds during which time no process control cycle is programmed. This allows an uninterrupted 4-millisecond interval during which the transients that are generated by the command execution cycle to die out prior to the time the next sensing function will be performed. This minimizes the effect that noise generated in this system will have on the system itself.

BRIEF DESCRIPTION OF DRAWINGS

In describing the specific embodiment of the present invention reference will be had to the following figures of drawings in which.

DETAILED DESCRIPTION

Figure 1:
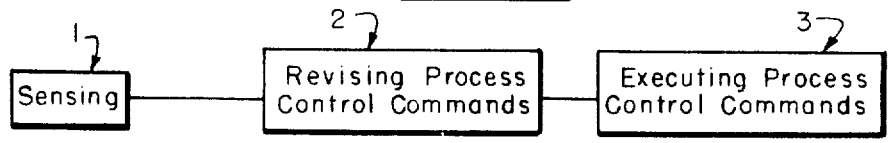
FIG. 1 illustrates in temporal sequence the functions which are performed in each process control cycle.

FIG. 1 is a functional block diagram in time sequence showing the sequence of the various functions performed in the process control system of the present invention. It is to be noted that the blocks 1, 2 and 3 respectively denote the functions and not specific structure. The blocks relate the time sequence of functions in accordance with the present invention. FIG. 1 shows that block number 1 sensing occurs first in the process control cycle. Subsequently, FIG. 1 shows that the process control commands are revised and updated in accordance with the new data entered from the sensing means. Block 3 illustrates the subsequent execution of the revised process control commands occurs.

Figure 2:
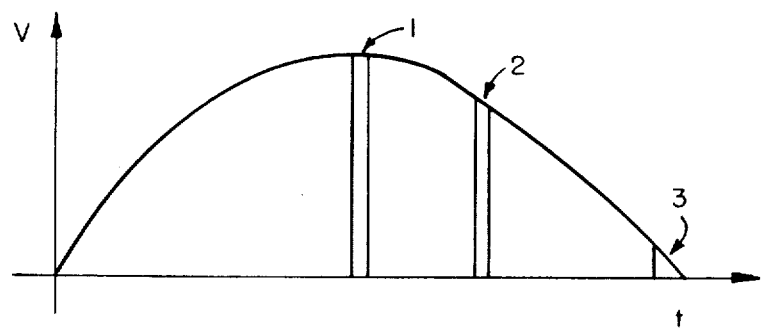
FIG. 2 illustrates a portion of the power source wave-form and the times at which the various functions of FIG. 1 are performed.

FIG. 2 relates the temporal sequence of functions shown in FIG. 1 to the power source waveform. FIG. 2 shows one half-cycle of the power source wave-form, i.e., the variation in power source voltage as it increases from zero to a maximum and then decreases to zero again. During this time, one cycle of the process control system takes place. In particular, the first function, that of sensing, occurs at the time, shown in FIG. 2, when the power source voltage is at a maximum amplitude. Subsequently, and prior to the time the power source voltage reaches zero, the second function, namely that of revising and updating the process control commands, occurs. Still later, as shown in FIG. 2, when the power source voltage approaches zero amplitude, the third function, that of executing process control commands, occurs. The detailed explanation of the principles of the present invention will now be given in discussing FIGS. 3 and 4.

Figure 3:
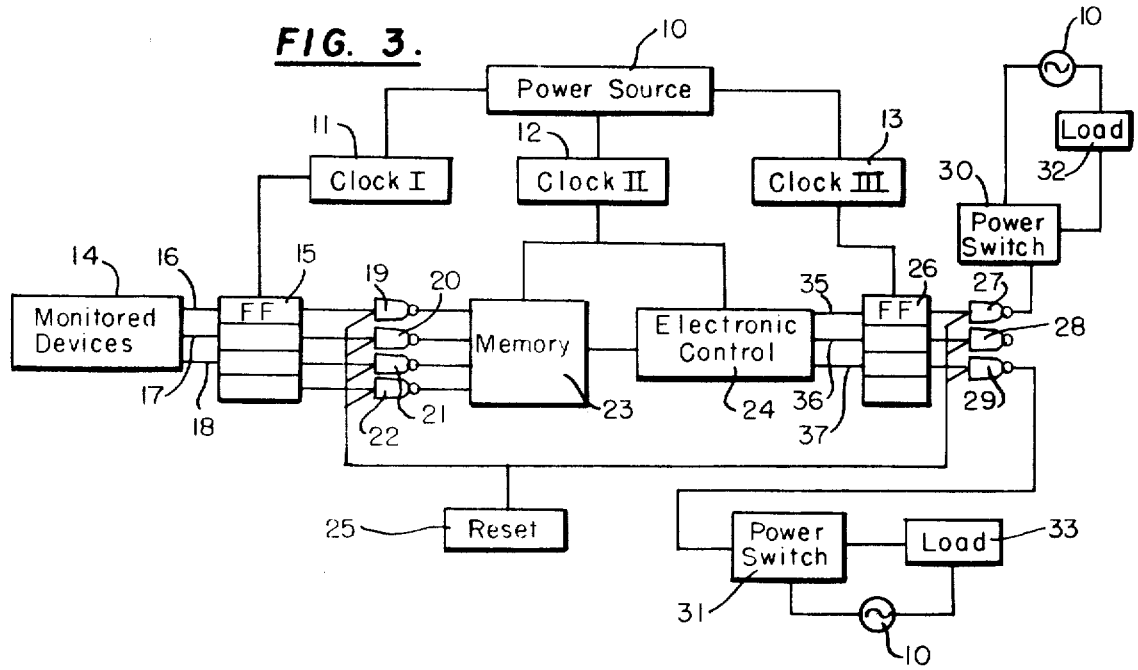
FIG. 3 illustrates a block diagram of a process control system employing the principles of the present invention.

FIG. 3 shows a block diagram of a process control system which incorporates the principles of the present invention. The power source 10 supplies power for the entire system and also controls the timing of the various functions. Connected to power source 10 are clocks 11, 12 and 13. Clock 11 generates a clocking signal I, clock 12 generates a clocking signal II, and clock 13 generates a clocking signal III. Each of the clocks comprise standard pulse formers to generate a short positive pulse clocking signal at the respective times shown in FIG. 4.

Figure 4:
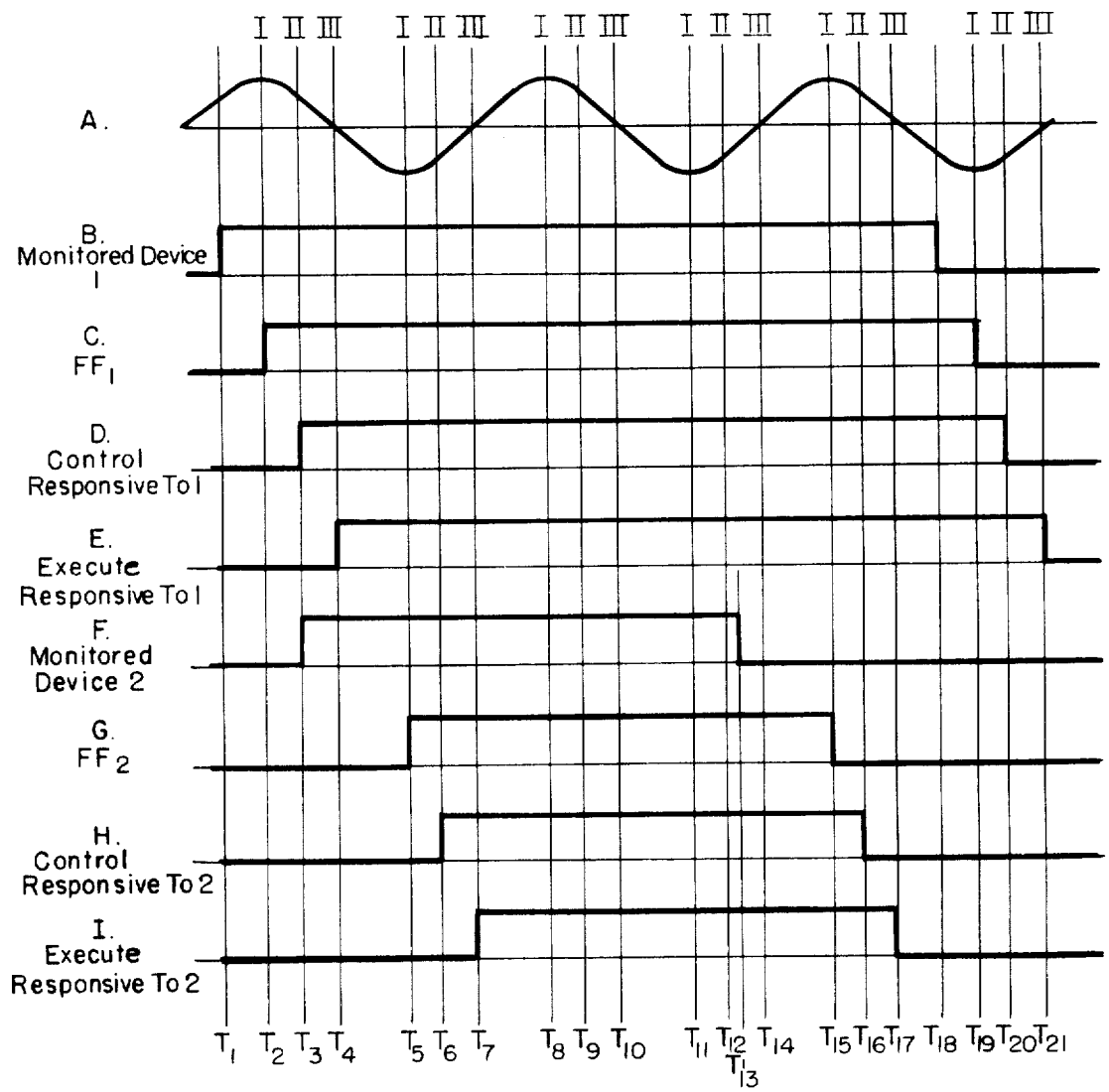
FIG. 4 is a timing diagram showing the relative times of occurrence of various pulses in the system in relation to the power source waveform.

FIG. 4, line A, shows the cyclical variations in the power source voltage. In addition, line A shows the clocking signals generated by each of clocks 11, 12 and 13. Reference to FIG. 4 shows that clock I is produced twice during each power source cycle, namely at the maximum amplitude portions of each cycle. Clock II is produced at predetermined time subsequent to clock I by a sufficient amount to allow the sensing signals gated by clock I to set up in a stable state. Clock III is generated also twice each cycle of the power source variation at the time the power source amplitude goes through zero. Each of these clocking signals controls various functions which will be described below.

Block 14 represents a number of monitored devices. The particular devices to be monitored will depend on the particular process which is being controlled by the process control system of the present invention. In a simple case, such a device can be a mechanical switch or relay contact, or a variety of devices such as are described in applicant's copending application Ser. No. 9,167 filed Feb. 6, 1970 and assigned to the assignee of the present application, or those disclosed in application Ser. No. 45,384, filed June 11, 1970, and also assigned to the assignee of the present application. As is more fully disclosed in the application referred to above, the output of each of the monitored devices is fed to a clocked flip-flop 15, having a separate stage for each device that is monitored. As an example, FIG. 4 shows on lines B and F that monitored device 1 and 2 close their respective switches at times $T_1$ and $T_3$. As the description proceeds, we shall see the effect on the system from the change of state of these devices at that time.

Inasmuch as each stage of the flip-flop 15 requires a clocking signal for that stage to be effective, the change of state of monitored device 1 at time $T_1$ will have no effect on its respective flip-flop stage until the occurrence of a clock signal I at time $T_2$. As shown in FIG. 4, line C, at this time the flip-flop stage corresponding to monitored device 1 changes state in response to the change of state of monitored device 1. Similarly although monitored device 2 changes state at time $T_3$, the corresponding flip-flop stage of flip-flop 15 does not change state until time $T_5$ when the next clocking signal from clock I becomes available. In a similar fashion, line B shows that the monitored device 1 returns to its original state at time $T_{18}$ and its respective stage of flip-flop 15 changes state in response thereto at the occurrence of the next clock signal I at time $T_{19}$. In a like manner, when monitored device 2 changes state at time $T_{13}$, its respective stage of flip-flop 15 reflects this change of state at time $T_{15}$, during the occurrence of the next available clock I.

As is more fully explained in the referred-to applications, the clocking of the sensing function reduces the effect on the process control system of noise present in the system. There are two manners in which this is effected. On the one hand, the fact that the stages of flip-flop 15 respond to input signals only at the time of clock signal I insures that noise which occurs at any other time cannot effect the indication given by the stages of flip-flop 15. On the other hand, the fact that the time of occurrence of clock I occurs at maximum amplitude in the power source voltage insures that the inputs to flip-flop 15 from the monitored devices, when they become active, will be at a maximum value. Therefore, the threshold of flip-flop 15 may be set at a relatively high level so that low level noise signals, even those which occur at the time of clock I, will not affect the condition of flip-flop 15. Further, only a relatively high level noise signal, and therefore a relatively rare occurrence can effect a spurious response in flip-flop 15.

The state of the stages of flip-flop 15 is reflected as input signals to a plurality of NAND gates 19 through 22. It should be understood that although four such gates are shown being controlled by four stages of flip-flop 15, any number can be provided, and a much larger number would ordinarily be provided, in accordance with the principles of the present invention. The NAND gates 19 through 22 form input gates for the high-speed electronic control portion of the process control system of the present invention. Specifically, memory 23 and electronic control 24 receive the newly sensed data from gates 19 through 22 at a time determined by clock II. Memory 23 and control 24 form the source for process control commands which are to be executed by the remainder of the system in order to properly control the process.

In generating these process control commands, the process control system responds to data input from the monitored devices 14 through the circuit previously described and acts on that data in accordance with a program or plan of action for control of the specific process in accordance with the variations of the sensed data. Inasmuch as such systems are well known, and form no part of the present invention, they are not described in detail herein. However, memory 23 and electronic control 24 are controlled by clock II to perform their functions at a particular time. As can be seen in FIG. 4, line A, the clock II occurs subsequent to clock I, a predetermined time sufficient to enable the outputs from gates 19 through 22 to become stabilized in accordance with the new information received from the monitored device 14.

In accordance with our previous example, it will be noted that electronic control 24 responds to the change of state of monitored device 1 at time $T_1$ by generating a process control command at time $T_3$, which is the time of occurrence of the next available clock II subsequent to the change of state of monitored device 1. Similarly, change of state of monitored device 2 at time $T_3$ is reflected by a process control command being generated at time $T_6$ which also is the next available clock II subsequent to the change of state of monitored device 2. In a like manner, the change of stated of monitored device 1 at time $T_{18}$ generates a revised process control command in response thereto at time $T_{20}$, and the change of state of monitored device 2 at time $T_{13}$ generates a revised process control command in response thereto at time $T_{16}$, each occurring at the next available clock II subsequent to the change of state of the monitored device.

The revised process control commands appear on output lines 35 through 37 of electronic control 24. Again, it will be understood that three such output lines are shown for purposes of illustration, but generally a much larger quantity would be required. Flip-flop 26 comprises a plurality of clocked flip-flop stages one for each of the output lines of electronic control 24. Inasmuch as flip-flop 26 is similar to flip-flop 15 in that it requires a clocking signal to respond to an input, the presence of each of the process control commands at the respective times discussed above will have no effect on the stages of flip-flop 26.

The clocking signal III occurs, as can be seen from FIG. 4, line A, each time the power source voltage passes through zero. As can be seen from FIG. 4, line E, the change of state of monitored device 1 at time $T_1$ results in a process control command execution at time $T_4$. In a like manner, process control commands are executed at time $T_{21}$ in response to a change in state of monitored device 1 at time $T_{18}$, a process control command is executed at time $T_7$ in response to a change of state of monitored device at time $T_{31}$ and another process control command is executed at time $T_{17}$ in response to a change of state of monitored device 2 at time $T_{13}$. Generally each process control command is executed at the next available clock III subsequent to the change of state of the particular monitored device to which the command is related.

The process control command execute signal at clock III causes the respective stage of flip-flop 26 to change state in response thereto. The execute signals are processed through NAND gates which are shown at 27 through 29, each being connected to an electronic power switch. Two such power switches 30 and 31 are illustrated in FIG. 3. Each switch controls the application of power to its respective load; again two such loads, 32 and 33, are illustrated. Of course, it will be understood that a plurality of loads is generally present in any process control system, each of which is controlled by its respective process control switch which is in turn fed by a NAND gate coupled to a respective stage of flip-flop 26. The details of the power switch 30 and 31 are more fully disclosed in application Ser. No. 3,801 filed Jan. 19, 1970 and assigned to the assignee of the present application.

The choice of clock III at a time when the power source voltage is substantially zero results in a number of advantages to the process control system from the standpoint of noise immunity. It is well known that a majority, if not most, process control systems employ inductive loads. These devices include such loads as motors, solenoid cells, relays, and arc welders. The switching on of such devices generally results in an indictuve surge of current which when reflected back into the line creates noise signals. By switching these devices on at a time when the power source voltage is substantially zero the amplitude of such noise signals which are generated will be substantially reduced. Each particular load may be switched off in a like manner to minimize the noise generated by the switching action. The process control command signal to deenergize a particular load is also generated in accordance with clock III. However, the load is actually deenergized at a time when the current through the load is substantially zero. This action is more fully disclosed in copending application Ser. No. 3,801 filed on Jan. 19, 1970 and assigned to the assignee of the present application. This results in reducing the amplitude of the noise pulses which the process control system itself generates and therefore reduces the effect that such noise will have on other components in this system. Further examination of FIG. 4, line A, will show that the execution cycle is followed by the next process control sensing function a full one-quarter cycle of power source voltage later. This period of time, which in a 60-cycle power system is 4 milliseconds in duration is allowed for the noise signals that are generated by the switching of inductive load to die down before the next sensing function is effected. This further reduces the possibility that the noise generated by the switching of these loads can generate spurious signals in some other components of the system.

In addition, reset signal generator 25 provides the process control system with a reset signal which is fed to all of the NAND gates of the system. As is well known, upon energization of an electronic system employing flip-flop devices, the particular state of a flip-flop during the energization process is indeterminate. That is, such a device may be in one state or another merely as a matter of chance and in no way related to the manner in which the system was designed to operate. Therefore, in order to prevent erroneous command executions due to the indeterminate state of the flip-flop in the system, the reset control 25 is provided. This merely comprises a pulse former which provides an input to each of the NAND gates when, and only when, the system voltage has reached a predetermined minimum level at which the flip-flop states are responsive to actual system conditions. Until such time, the absence of the second input to each of the NAND gates will prevent the indeterminate state of each of the flip-flop stages from having any adverse effect on the system configuration. In addition, the reset control can be utilized to provide a variety of other functions in that its removable from any particular NAND gate will prevent that gate from passing any signals.

The present invention provides a system for controlling process systems to minimize the effect on the system of external noise that is noise-generated external to the process control system, and at the same time minimizes the amount of noise generated internally. These functions are accomplished by allowing the specific functions of the process system to occur at only predetermined times, each of the predetermined times being different for each of the different functions that are performed by the process control system. The sensing function is allowed to be effective only at the time when the power source voltage is at a maximum. As has been explained above, this minimizes the effect on the sensing function of any noise which is present in the system. The electronic control which acts in response to the sensed signals is allowed to occur only when the sensing signals have become stable. This further minimizes the possibility that a spurious noise signal will be misinterpreted as a valid signal. The execution of process control commands is designed to occur only at times when the power source voltage is substantially zero. This minimizes the noise generated by the execution of these commands in that it minimizes the inductive surges caused by switching of inductive loads. The system further provides for a large time interval between execution of process control commands and the next cycle of sensing functions. Although the noise generated by process control command execution is minimized, it cannot be eliminated and this minimum amount of noise is allowed a large time interval to die out before the process control parameters are again sensed. In addition each of the functions is restricted to occur at predetermined times. As a result noise which may be present in the system, at other times, will not have any effect on the proper system operation.

What is claimed is:

1. A method of controlling a process control system which is powered by a cyclical power source comprising the time-sequenced steps of,
   sensing process control parameters at the time said cyclical power source voltage is substantially at its maximum amplitude,
   storing said sensed parameter signals,
   deriving revised process control commands, and
   executing said revised process control commands at the times said cyclical power source voltage is substantially at its minimum amplitude.

2. The method of claim 1 in which the first-named step comprises,
   generating a train of pulses, each pulse of said train occurring when said cyclical power source voltage is substantially at its maximum amplitude,
   enabling a plurality of bistable devices, each associated with one of said process control parameter sensors, to generate an output signal in accordance with the condition of each of said process control parameter sensors, on the occurrence of one of said train of pulses.

3. The method of claim 2 wherein the steps of storing said sensed parameters signals and the step of deriving revised process control commands comprise,
   generating a second train of pulses, each pulse of said second train of pulses occurring subsequent to the time said cyclical power source voltage is substantially at its maximum amplitude but prior to the time said cyclical power source voltage is substantially at its minimum amplitude,
   enabling the generation of revised process control commands on the occurrence of one of said second train of pulses.

4. In the method of claim 3 wherein the step of executing said revised process control commands comprises,
   generating a third train of pulses, each pulse of said third train of pulses occurring at the time said cyclical power source voltage is substantially at its minimum amplitude,
   enabling a plurality of second bistable devices, each associated with one of a plurality of power switch means, to generate output signals at the time of occurrence of one of said third train of pulses.

5. A process control system comprising,
   a cyclical power source,
   a plurality of process control parameter sensors,
   means responsive to said power source and operative when said cyclical power source voltage is substantially at its maximum amplitude to sense process control parameters,
   a process control command generator operatively associated with said process control parameter sensors and responsive to said power source to generate revised process control commands subsequent to the time said cyclical power source voltage is substantially at its maximum amplitude but prior to the time said cyclical power source voltage is substantially at its minimum amplitude, and
   process control command execution means responsive to said power source for executing said revised process control commands at the time said cyclical power source voltage is substantially at its minimum amplitude.

6. In the system of claim 5 wherein said process control parameter sensors comprise,
   a plurality of bistable devices, each of said bistable devices associated with one of said process control parameter sensors,
   a clock signal generator controlled by said cyclical power source means and adapted to generate a train of pulses, each pulse of said train of pulses occurring when said cyclical power source mean voltage is substantially at its maximum amplitude,
   said clock signal generator cooperating with said plurality of bistable devices so that said bistable devices are operative to product output signals only at the time of occurrence of one of said train of pulses.

7. The system of claim 6 which further includes,
   second clock signal generator means controlled by said cyclical power source means to produce a second train of pulses, each pulse of said second train of pulses occurring subsequent to the time said cyclical power source voltage is substantially at its maximum amplitude but prior to the time said cyclical power source voltage is substantially at its minimum amplitude, said second clock signal generating means cooperating with said process control command generator so that said process control command generator is operative to generate revised process control commands only at the time of one of said second train of pulses.

8. The system of claim 7 in which said process control command execution means comprises,
- third clock signal generator means controlled by said cyclical power source means to generate a third train of pulses each pulse of said third train of pulses occurring at the time said cyclical power source voltage is substantially at its minimum amplitude,
- a plurality of second bistable devices, each of said second bistable devices associated with one of a plurality of power switch means,
- each of said plurality of second bistable devices being controlled by said third clock signal generator means to produce an output only at the time of occurrence of one of said third train of pulses.

9. The system of claim 8 which further includes reset means to initialize said system during the initial application of power to the system comprising,
- a first plurality of gates jointly controlled by said plurality of bistable devices and said reset means, a second plurality of gates jointly controlled by said plurality of second bistable devices and said reset means, said reset means producing an output signal when the voltage applied to said system has risen to a predetermined value,
- said first and second plurality of gates inhibiting the passage of signals until such time as said reset means produces an output signal.

10. A substantially noise-immune process control system comprising,
- an alternating-current power source,
- at least one controlled device being operable between at least two differently distinctive control conditions in response to a control signal applied thereto,
- at least one condition responsive means operable between at least two differently distinctive states in dependence upon at least one condition of a process controlled by said process control system,
- means controlled at least in part by said power source for rendering said condition responsive means responsive to said process condition only at the time, at least once on each cycle of the alternating-current source, that the waveform of the voltage of said power source is substantially at its maximum amplitude, whereby said condition responsive means responds periodically to indicate a change in the respective process condition indicated thereby at a time of minimum likelihood of interference by noise signals,
- control signal generating means being responsive in part to said power source for generating a new control signal for each controlled device at least one each cycle of said alternating-current source at a predetermined time subsequent to the time its waveform has attained its maximum amplitude but prior to the time it has attained a zero amplitude,
- said control signal generating means being also responsive in part to the then-operated conditions of said condition responsive means at the time said new control signals are generated,
- whereby sufficient time elapses subsequent to operation of each said condition responsive means to stabilize its output means and thereby reduce generation of erroneous control signals,
- operating means for said controlled devices controlled in part by said power source for controlling each said controlled device to a distinctive control condition only at the time the waveform of said power source is substantially at zero amplitude,
- said operating means being further responsive at least in part to the control signals most recently generated by said control signal generating means when controlling said controlled devices,
- whereby the generation of noise signals resulting from the operation of said controlled devices is minimized and sufficient time is provided between operation of each said controlled device and the time that each said condition responsive means is next rendered responsive to allow noise signals produced by operation of said controlled device to dissipate, thereby minimizing the effect of noise signals produced by said operating means on said condition responsive means.

* * * * *